W. N. DICKINSON, Jr.
MOTOR CONTROL.
APPLICATION FILED JULY 3, 1906.
982,041.
Patented Jan. 17, 1911.
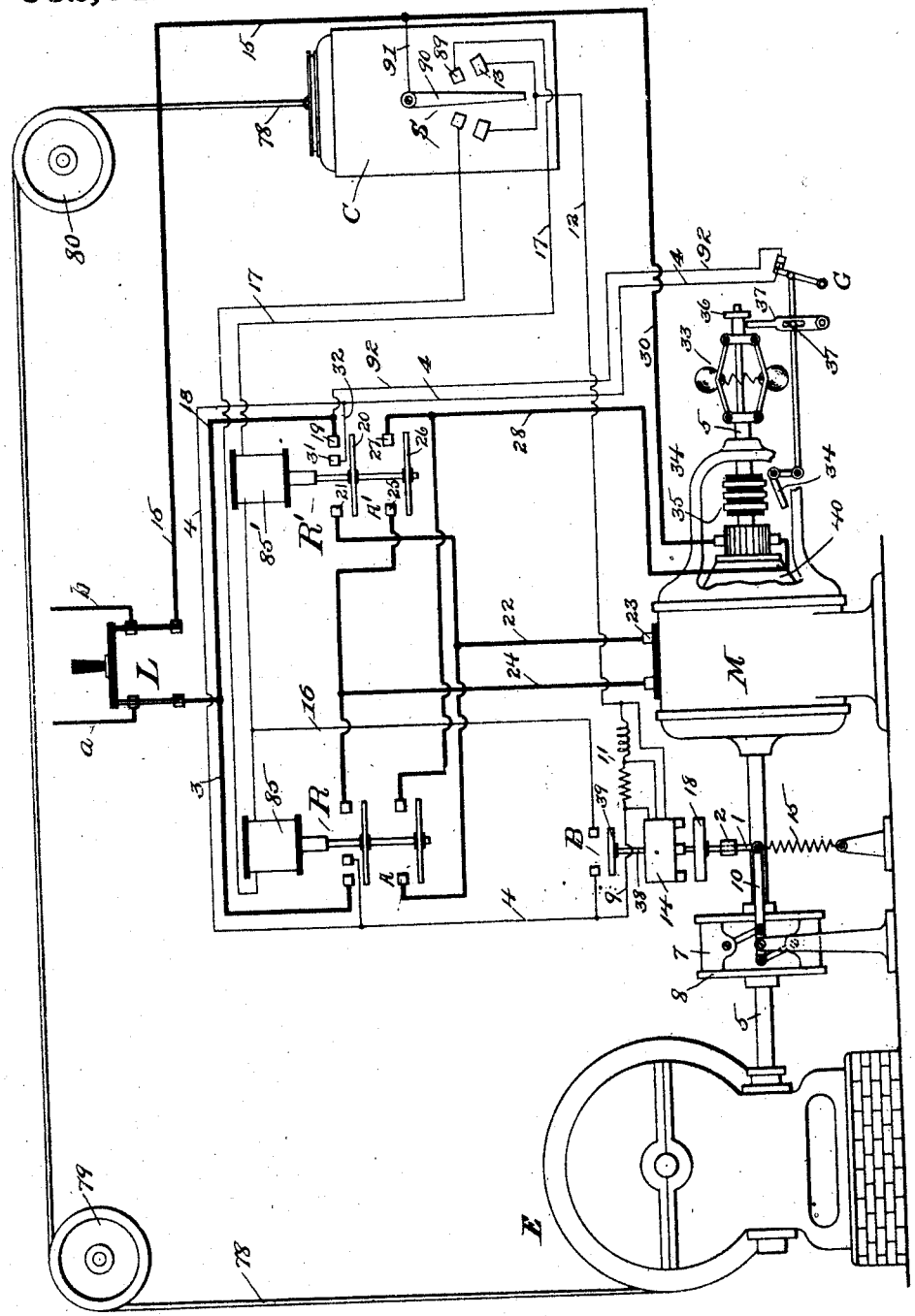
Witnesses
Walter C. Strang
J. A. Kinsley
Inventor
William N. Dickinson, Jr.
By Chas. M. Nissen
Attorney

UNITED STATES PATENT OFFICE.

WILLIAM N. DICKINSON, JR., OF NEW YORK, N. Y., ASSIGNOR TO OTIS ELEVATOR COMPANY, OF JERSEY CITY, NEW JERSEY, A CORPORATION OF NEW JERSEY.

MOTOR CONTROL.

982,041.  Specification of Letters Patent.  Patented Jan. 17, 1911.

Application filed July 3, 1906. Serial No. 324,540.

*To all whom it may concern:*

Be it known that I, WILLIAM N. DICKINSON, Jr., a citizen of the United States, residing in New York city, borough of Brooklyn, and State of New York, have invented a new and useful Improvement in Motor Control, of which the following is a specification.

My invention relates to motor controlling apparatus and one of its objects is the provision for minimizing the consumption of current at any one time in the starting of an alternating current electric motor.

A further object of the present invention is the provision of means for reducing the starting current of a single phase elevator by controlling the same to effect the release of the brake and providing the necessary starting torque in the motor at different times so that the brake-magnet current and the motor-starting current shall not be drawn from the main line circuit simultaneously.

More particularly it is the object of this invention to provide means for operating the brake magnet to effect the release of the brake and the closing of the magnetic circuit of the brake magnet and immediately thereafter to supply current to the motor to start the same.

Other objects of my invention will appear hereinafter, the novel combinations of elements being pointed out in the claims.

In the accompanying drawing is shown a single-phase motor M directly connected by means of the shaft 5 to the elevator hoisting apparatus E which is connected to the car C by means of the cable 78 passing over the sheaves 79 and 80. In the car C is located a controlling switch S and on a controlling board, preferably in proximity to the winding machine, are located the up-magnet and down-magnet 85, 85' for operating the reversing switches R, R'.

The motor M is arranged as a series motor and to run as an induction motor, and I prefer to use no resistance in connection with the same in starting. A centrifugal governor 33, however, is provided to move the short-circuiting device 34 against the slip rings 35 of the motor to electrically connect the same with each other. That is, the motor starts as a series motor and at a predetermined speed its slip rings are electrically connected with each other so that thereafter the motor will operate as an induction motor. The governor may be connected to the short-circuiting device 34 and to the shaft 5 in any desired manner. This particular form of motor and starting device form no part of the present invention, and are therefore not shown in detail. Associated with the governor 33 is a collar 36 which will engage the lever arm 37 to open the switch G when the motor reaches a predetermined speed. The purpose of this switch G will be hereinafter explained.

The brake apparatus is of the electric type and the magnet 14 for operating the same is preferably multiphase, the current for energizing the same being obtained from a single-phase circuit in combination with a phase-splitting device 11. The brake 7 is associated with the brake pulley or coupling 8 and is adapted to be applied by means of the spring 15 and the weight of the armature 18 acting on the brake lever 10 and the toggle mechanism connected thereto. The armature 18 is mounted at the upper end of the rod 1 which is movable through the guide 2, and to the upper side of said armature 18 is secured a rod 38 which in this instance passes through the center of the magnet 14 and has attached to its upper end the bridge piece 39 which constitutes a part of the switch B.

Assuming now that the car is to be operated, and the switch 90 is therefore moved onto contacts 89 and 13, a circuit will be closed through the brake magnet 14 from the main line *a* and main line switch L by way of wire 3, switch G, wire 4, wire 9, phase-splitting device 11, the coils of the electro-magnet 14, wire 12, contact 13, lever 90, wires 91 and 93, to the other main *b*. The brake magnet 14 being thus energized, its armature will be lifted to effect the release of the brake and also the closing of the switch B. It will be obvious that neither the magnet 85 nor the magnet 85' can receive current until the switch B is closed. When the lever 90 has been moved to its right-hand position and the switch B closed, a circuit is completed from the main *a* through wire 92, switch G, wire 4, switch B, wire 16, electro-magnet 85', wire 17, contact 89, lever 90, wires 91 and 93, to the other main *b*. The switches R' and A' will now be closed so that the motor M will receive current and the brake having been released, the car will be moved in the proper direction. Of course the time between the release of the brake and the closure of the switches R', A', must be very short so that the car cannot start the elevator apparatus to drive the same. Upon the closure of the switches R', A', the motor circuit may be traced from the main $a$, through the wire 18, contact 19, bridge piece 20, contact 21, wire 22, motor terminal 23, and thence through the field or stator of the motor to the wire 24, contact 25, bridge piece 26, contact 27, wire 28, armature or rotor 40, wires 30 and 93, to the other main $b$. By the closure of the switch R', a holding circuit is closed through wire 18, contact 19, bridge piece 20, contact 31, and wires 32, 4, switch B, to the electro-magnet 85'. This short-circuits the switch G and therefore the opening of the latter after the switch R' has been closed will have no effect. If, however, upon moving the lever 90 of the car switch S to one of its closed positions, a corresponding reversing switch magnet refused to operate to close either the switch R or R', the switch G associated with the governor apparatus would immediately act to effect the deënergization of the magnet 14 and the consequent application of the brake to stop the car if it should be started by the load or counterweight. That is, since the brake magnet 14 depends upon the switch G being closed to receive current when the brake is released and no current is immediately applied to the motor, the car might tend to drive the latter, in which case the governor 33 would immediately act to open the switch G and cut off current from the magnet 14. Under normal conditions of operation, that is, when the reversing switches operate as desired, it will be clear that upon closing the car switch S, the full current required to energize the brake-magnet 14 with an open magnetic circuit will be called for, but at this instant no circuit is completed to the motor. The brake magnet on being energized immediately lifts its armature and closes its magnetic circuit, thus materially reducing the current flowing through its coils. The switch B will also be closed and a circuit completed through the electro-magnet 85 or 85'. This will not occur, however, until the brake magnet current has been reduced to its minimum, after which the full current required to start the motor as a repulsion motor is called for.

The principle of providing a time element between the throwing of the current onto the brake-releasing magnet, and the directing of the current to the motor through the action of the brake magnet, is also applicable to elevators operated by single-phase motors or multiphase induction motors or direct current motors. It is obvious furthermore that various changes in the details and arrangement of parts may be made by those skilled in the art without departing from the spirit and scope of my invention as defined by the claims. I desire therefore not to be limited to the precise construction herein disclosed.

Having thus fully described my invention, what I claim and desire to have protected by Letters Patent of the United States is:—

1. The combination with a motor, of a brake therefor, a brake releasing magnet of the multi-phase type, an armature connected to said brake, said armature being adapted to close the magnetic circuit of said magnet, a reversing switch, and means controlled by said magnet for effecting the operation of said switch almost simultaneously with the completion of the magnetic circuit of said magnet.

2. The combination with an alternating current motor, of a brake therefor, an alternating current magnet for releasing the brake, an electromagnetic switch controlling the supply of current to the motor, means for supplying current to said magnet and causing the same to operate to close its magnetic circuit, and means for supplying current to the magnet winding of said switch after current is supplied to the magnet.

3. The combination with a motor, of a reversing switch therefor, a brake, a brake-releasing magnet, and a switch connected to and operated by said magnet for controlling said reversing switch.

4. The combination with an alternating current motor, of reversing switches, electro-magnets for operating said reversing switches, a brake, an electro-responsive device for releasing the brake, and means operated by said device for controlling said electro-magnets to automatically supply current to the motor after the circuit of said electro-responsive device has been closed.

5. The combination with an alternating current motor, of a brake therefor, brake-releasing apparatus comprising a multiphase alternating-current magnet and an armature, a reversing switch for the motor, single-phase electro-magnets for operating said reversing switch, and an additional switch controlling said electro-magnets to effect the closure of the motor circuit after the magnetic circuit of said multiphase alternating current magnet has been closed by its armature.

6. In an elevator system, the combination with a car, hoisting apparatus and an alternating current motor, of an electro-magnetic device controlling the motor; a brake, electro-responsive apparatus operated by multiphase alternating current for releasing said brake, and means permitting current to be supplied to said electromagnetic device only after said electro-responsive apparatus receives current and its magnetic circuit is substantially closed.

7. The combination with a motor, of a brake therefor, electro-responsive apparatus for releasing said brake, and a safety device dependent upon the operation of the motor for interrupting the current to said electro-responsive apparatus if the motor receives no current.

8. The combination with a motor, of a brake therefor, electro-responsive apparatus for releasing said brake, and a safety device dependent upon the motor for its operation to cut off current from said electro-responsive apparatus if the motor should start without receiving current.

9. The combination with a motor, of reversing switches therefor, a brake, electromagnetic apparatus for releasing said brake, a safety switch associated with the motor and connected in circuit with the electromagnetic apparatus when the motor is at rest, and means dependent upon the actuation of the reversing switch for maintaining said brake in released position after the motor starts.

10. In an elevator system, the combination with a car, hoisting apparatus and motor, of a brake, brake-releasing apparatus comprising a magnet, motor-controlling means, a switch operated by said magnet and on which the operation of said motor-controlling means is dependent, a safety switch, a car switch for closing a circuit through said safety switch and said magnet, connections between the motor and safety switch to open the latter after the motor starts, and an auxiliary switch co-acting with the reversing switch to close a holding circuit through the brake magnet.

11. The combination with an electric motor, of controlling switches therefor, electromagnetic brake apparatus, a master switch for effecting the operation of said controlling switches and said brake apparatus, a safety switch, a governor for opening said safety switch upon starting the motor, and means dependent upon the controlling switches for maintaining the brake in released position while the motor operates.

12. The combination with an induction motor of the commutator type, of reversing switches therefor, brake apparatus, a multiphase magnet for operating said brake apparatus, a safety switch in circuit with said magnet, a short-circuiting switch for the rotor circuits, a governor for opening said safety switch and closing said short-circuiting switch upon the motor attaining a predetermined speed, and a holding circuit for said brake magnet.

In testimony whereof, I have signed my name to this specification in the presence of two subscribing witnesses.

WILLIAM N. DICKINSON, Jr.

Witnesses:
  CHARLES M. NISSEN,
  W. H. BRADY.